US011738592B2

(12) United States Patent
Kuwahara (10) Patent No.: US 11,738,592 B2
(45) Date of Patent: Aug. 29, 2023

(54) METHOD FOR PRODUCING A STRIP OF THREE-DIMENSIONAL DECORATIVE PIECE MADE OF THERMOPLASTIC SYNTHETIC RESIN AND APPARATUS FOR PRODUCING THE SAME

(71) Applicant: Takeshi Kuroda, Osaka (JP)

(72) Inventor: Eiji Kuwahara, Osaka (JP)

(73) Assignee: Takeshi Kuroda, Osaka (JP)

( * ) Notice: Subject to any disclaimer, the term of this patent is extended or adjusted under 35 U.S.C. 154(b) by 230 days.

(21) Appl. No.: 17/436,038

(22) PCT Filed: Mar. 26, 2019

(86) PCT No.: PCT/JP2019/012791
§ 371 (c)(1),
(2) Date: Sep. 2, 2021

(87) PCT Pub. No.: WO2020/194496
PCT Pub. Date: Oct. 1, 2020

(65) Prior Publication Data
US 2022/0169066 A1    Jun. 2, 2022

(51) Int. Cl.
*B44B 5/00* (2006.01)
*B44B 5/02* (2006.01)
*B44C 1/24* (2006.01)

(52) U.S. Cl.
CPC ............ *B44B 5/008* (2013.01); *B44B 5/0009* (2013.01); *B44B 5/009* (2013.01); *B44B 5/028* (2013.01); *B44C 1/24* (2013.01); *B44B 2700/00* (2013.01)

(58) Field of Classification Search
CPC ....... B44B 5/008; B44B 5/0009; B44B 5/009; B44B 5/028; B44B 2700/00; B44C 1/24
See application file for complete search history.

(56) References Cited

U.S. PATENT DOCUMENTS 5,589,022 A    12/1996 Kuwahara
8,168,104 B2 *  5/2012 Han ................. B44B 5/0009
                                              264/177.17
(Continued)

FOREIGN PATENT DOCUMENTS

GB    811580 A    4/1959
GB   1242943 A    8/1971
(Continued)

OTHER PUBLICATIONS

Jul. 2, 2019 International Search Report issued in International Patent Application No. PCT/JP2019/012791.

*Primary Examiner* — David H Banh
(74) *Attorney, Agent, or Firm* — Oliff PLC (57) ABSTRACT

A method and an apparatus for producing a long strip of three-dimensional decorative piece made of thermoplastic synthetic resin. The method for producing the strip of three-dimensional decorative piece made of thermoplastic synthetic resin according to the present invention comprises the steps of feeding a decorative strip material, preheating the decorative strip material and softening the decorative strip material with heat, shaping the decorative strip material into a strip of three-dimensional decorative piece by continuously oscillating a high-frequency in between a rotatable upper electrode roll die and a rotatable lower electrode roll die and applying high-frequency dielectric heat to the decorative strip material between the upper and lower electrode roll dies, cooling the shaped strip of three-dimensional decorative piece, and winding up the cooled strip of three-dimensional decorative piece.

11 Claims, 9 Drawing Sheets

(56) References Cited

U.S. PATENT DOCUMENTS

2007/0296118 A1    12/2007  Kuwahaha
2020/0384797 A1*   12/2020  Kuwahara .............. B44C 3/025
2022/0402190 A1*   12/2022  Kuroda ................ B29C 66/742

FOREIGN PATENT DOCUMENTS

| JP | S63-247023 A  | 10/1988 |
| JP | 3235943 B2    | 12/2001 |
| JP | 2008-030199 A | 2/2008  |
| JP | 6450826 B1    | 1/2019  |

* cited by examiner

METHOD FOR PRODUCING A STRIP OF THREE-DIMENSIONAL DECORATIVE PIECE MADE OF THERMOPLASTIC SYNTHETIC RESIN AND APPARATUS FOR PRODUCING THE SAME

TECHNICAL FIELD

The present invention relates to a method and an apparatus for producing a strip of three-dimensional decorative piece of thermoplastic synthetic resin with a metallic appearance, a mall appearance, a woodgrain pattern or the like to be attached to an object such as a car, a motorbike, a boat, an electric appliance, a game console, clothes, a bag, or a cap. More specifically, the present invention relates to a method and an apparatus for producing a strip of striped woven gold wire to be sewn or attached to a uniform sleeve, trousers, or a cap, a strip of three-dimensional decorative piece with a metallic appearance to be adhered to a car, an electric appliance, or the like, and a strip of three-dimensional decorative piece with a woodgrain pattern to be adhered or sewn to a piece of furniture or the like.

BACKGROUND ART

A long strip of three-dimensional decorative piece of thermoplastic synthetic resin is produced using high-frequency dielectric heating, e.g., by a high-frequency welder. They are applied to emblems, appliques, and stickers (see Patent Document 1, for example).

LIST OF PRIOR ART

[Patent Document 1] Japanese Patent No. 3235943

Problems to be Solved by the Invention

Long decorative tapes such as striped woven gold wires are sewn or attached, for example as a decoration, to a uniform sleeve, trousers, a cap, or the like. As these long decorative tapes are produced by weaving fine gold threads or silver threads, their processing is time consuming. Also, in recent years, it has become difficult to obtain such long woven decorative tapes because the number of manufacturers has extremely decreased due to limited markets.

Thus, there is a demand for producing a strip of three-dimensional decorative piece of thermoplastic synthetic resin in replacement of a long piece of decorative tape such as a striped woven gold wire. To create a three-dimensional decorative piece, a decorative strip material is required to place between dies and then subject to high-frequency dielectric heating, whereby the decorative strip material is softened, shaped, and fusion-bonded. However, the three-dimensional decorative piece to be produced is limited by the width, especially the length of the dies, with the result that a long strip of three-dimensional decorative piece of thermoplastic synthetic resin was difficult to produce.

An object of the present invention is to provide a method and an apparatus for producing a strip of long three-dimensional decorative piece of thermoplastic synthetic resin.

Means of Solving the Problems

The present invention provides a method for producing a strip of three-dimensional decorative piece of thermoplastic synthetic resin, the method comprising:

a step of feeding a decorative strip material having three layers of a lower layer, an upper layer on the lower layer, and a protective retention layer on the upper layer, wherein the lower layer is a sheet of thermoplastic synthetic resin, the upper layer is a film of thermoplastic synthetic resin, and the protective retention layer is not to be fusion-cut by the heat of a high frequency;

a step of preheating the decorative strip material to soften the strip material with heat;

a step of shaping the decorative strip material into a strip of three-dimensional decorative piece by continuously oscillating a high-frequency in between a rotatable upper electrode roll die and a rotatable lower electrode roll die and applying high-frequency dielectric heat to the decorative strip material between the upper and lower electrode roll dies;

a step of cooling the shaped strip of three-dimensional decorative piece; and a step of winding up the cooled strip of three-dimensional decorative piece.

The feeding step comprises drawing out the lower layer, the upper layer, and the protective retention layer from their respective feeding rolls while being stacked in three layers, and supplying as the decorative strip material to the preheating step.

The preheating step comprises softening the decorative strip material between an upper heating roll and a lower heating roll that are arranged facing each other vertically and are configured to rotate synchronously with each other.

The cooling step comprises cooling the strip of three-dimensional decorative piece between an upper cooling roll and a lower cooling roll that are arranged facing each other vertically and are configured to rotate synchronously with each other.

The upper electrode roll die has a circumferential surface with one or more fusion-cutting blades projecting therefrom.

The upper electrode roll die has a body portion engraved with a pattern.

The feeding step comprises drawing out the decorative strip material having a synthetic resin foam sheet placed between the lower layer and the upper layer.

The feeding step comprises drawing out the decorative strip material wherein a substrate sheet, a double-sided tape or a hot-melt film are placed under the lower sheet including a strip of thermoplastic synthetic resin sheet.

The present invention provides an apparatus for producing a strip of three-dimensional decorative piece of thermoplastic synthetic resin, the apparatus comprising:

a feeding mechanism configured to feed a decorative strip material having three layers of a lower layer, an upper layer on the lower layer, and a protective retention layer on the upper layer, wherein the lower layer is a sheet of thermoplastic synthetic resin, the upper layer is a film of thermoplastic synthetic resin, and the protective retention layer is not to be fusion-cut by the heat of a high frequency;

a preheating mechanism provided on a downstream side of the feeding mechanism and configured to soften the decorative strip material with heat;

a shaping mechanism provided on a downstream side of the preheating mechanism, wherein the shaping mechanism comprises a rotatable upper electrode roll die and a rotatable lower electrode roll die capable of contact with the upper electrode roll die, the shaping mechanism being configured to shape the decorative strip material into a strip of three-dimensional decorative piece by continuously oscillating a high-frequency in between the rotatable upper electrode roll die and the rotatable lower electrode roll die and applying high-frequency dielectric heat to the heat-softened decorative strip material between the upper and lower electrode roll dies;

a cooling mechanism provided on a downstream side of the shaping mechanism and configured to cool the shaped strip of three-dimensional decorative piece; and a winding mechanism provided on a downstream side of the cooling mechanism and configured to wind up the cooled strip of three-dimensional decorative piece.

The upper electrode roll die has a circumferential surface with one or more fusion-cutting blades projecting therefrom.

The upper electrode roll die has a body portion engraved with a pattern.

The preheating mechanism comprises an upper heating roll and a lower heating roll that are arranged facing each other vertically and configured to rotate synchronously with each other.

The cooling mechanism comprises an upper cooling roll and a lower cooling roll that are arranged facing each other vertically and configured to rotate synchronously with each other.

The upper electrode roll die, the upper heating roll, and the upper cooling roll are placed on an upper mechanism that is movable up and down.

The upper electrode roll die, the upper heating roll, and the upper cooling roll are power-transmissibly connected to each other and rotatable with an upper motor, and the lower electrode roll die, the lower heating roll and the lower cooling roll are power-transmissibly connected to each other and rotatable with an lower motor.

Effects of the Invention

According to the method and the apparatus for producing a strip of three-dimensional decorative piece of thermoplastic synthetic resin of the present invention, a decorative strip material is continuously fed, preheated and softened, subject to dielectric heating through a high frequency between a rotating upper electrode roll die and a rotating lower electrode die, and shaped into a strip of three-dimensional decorative piece. The shaped strip of the three-dimensional decorative piece may be cooled to keep its shape and then be wound out.

MODE FOR CARRYING OUT THE INVENTION

A strip of three-dimensional decorative piece 100 of thermoplastic synthetic resin according to the present invention and a method for producing the same will be described with reference to the drawings. First, a production apparatus 10 will be described. Next, a preferred embodiment of a decorative strip material 101 and a preferred method for producing the strip of three-dimensional decorative piece 100 will be described. In the drawings, the thickness of each layer of the strip of three-dimensional decorative piece 100, the thickness of each layer of the strip of decorative strip material 101, the recess and protrusion and thickness of the dies, and the like are shown exaggerated to facilitate explanation of their structures. In addition, their shape, pattern, size, and the like are examples and can be modified as appropriate.

<Production Apparatus 10 for Producing a Strip of Three-Dimensional Decorative Piece 100 of Thermoplastic Synthetic Resin>

FIGS. 1 to 4 show an embodiment of the present production apparatus 10 for producing a strip of three-dimensional decorative piece 100 of thermoplastic synthetic resin. The production apparatus 10 shown in FIG. 1 comprises a feeding mechanism 20 on an upstream side, a processing mechanism 30 at a central portion, and a winding mechanism 70 on a downstream side, wherein the upstream is on the right side of the paper. The processing mechanism 30 comprises, from the upstream side, a preheating mechanism 40, a shaping mechanism 50, and a cooling mechanism 60. Each of these mechanisms is provided in an upper mechanism 31 and a lower mechanism 32 that are movable toward each other or away from each other, in the direction of upward and downward.

Figure 1:
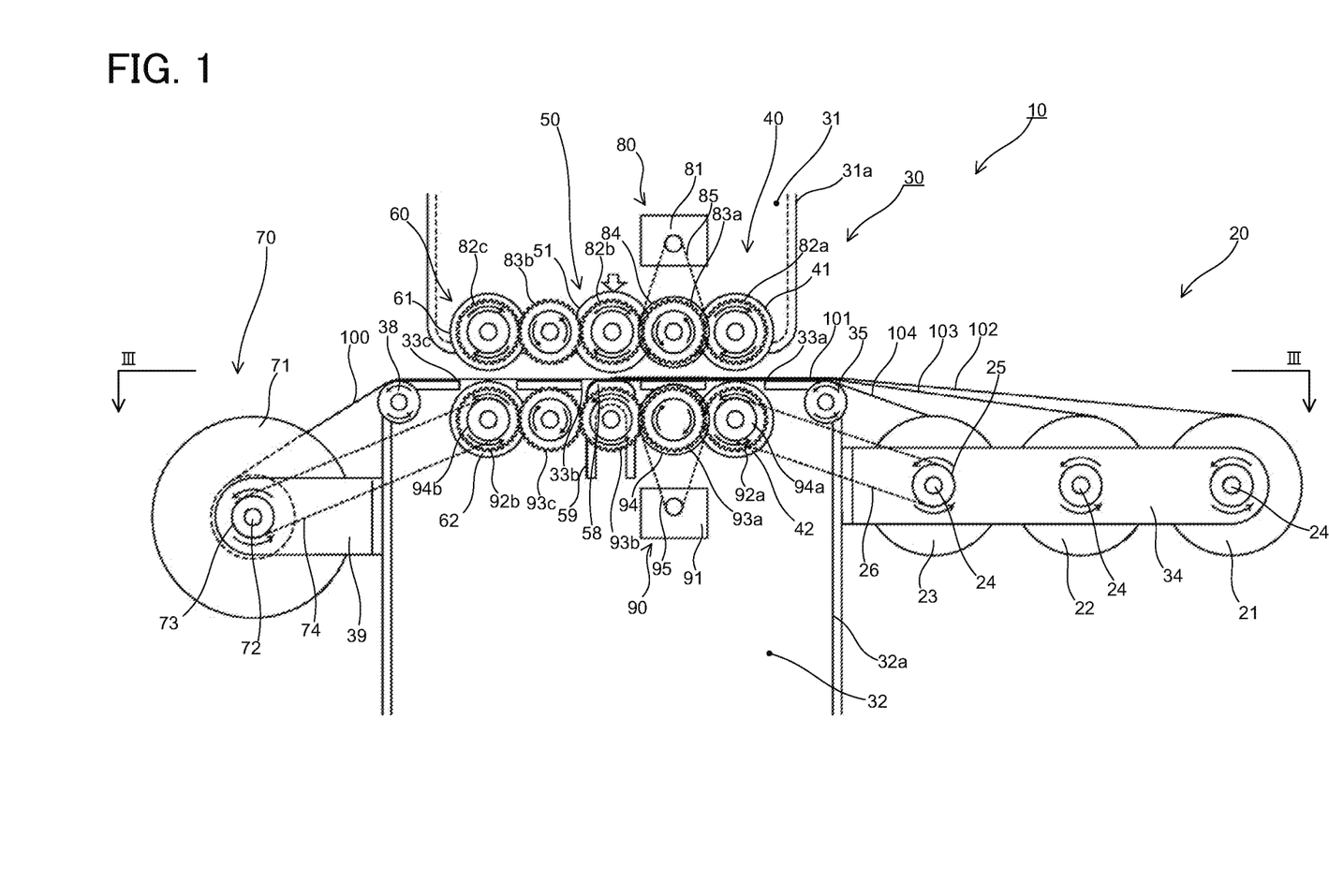
FIG. 1 is a side view showing a structure of an apparatus for producing a strip of three-dimensional decorative piece according to an embodiment of the present invention.
Figure 3:
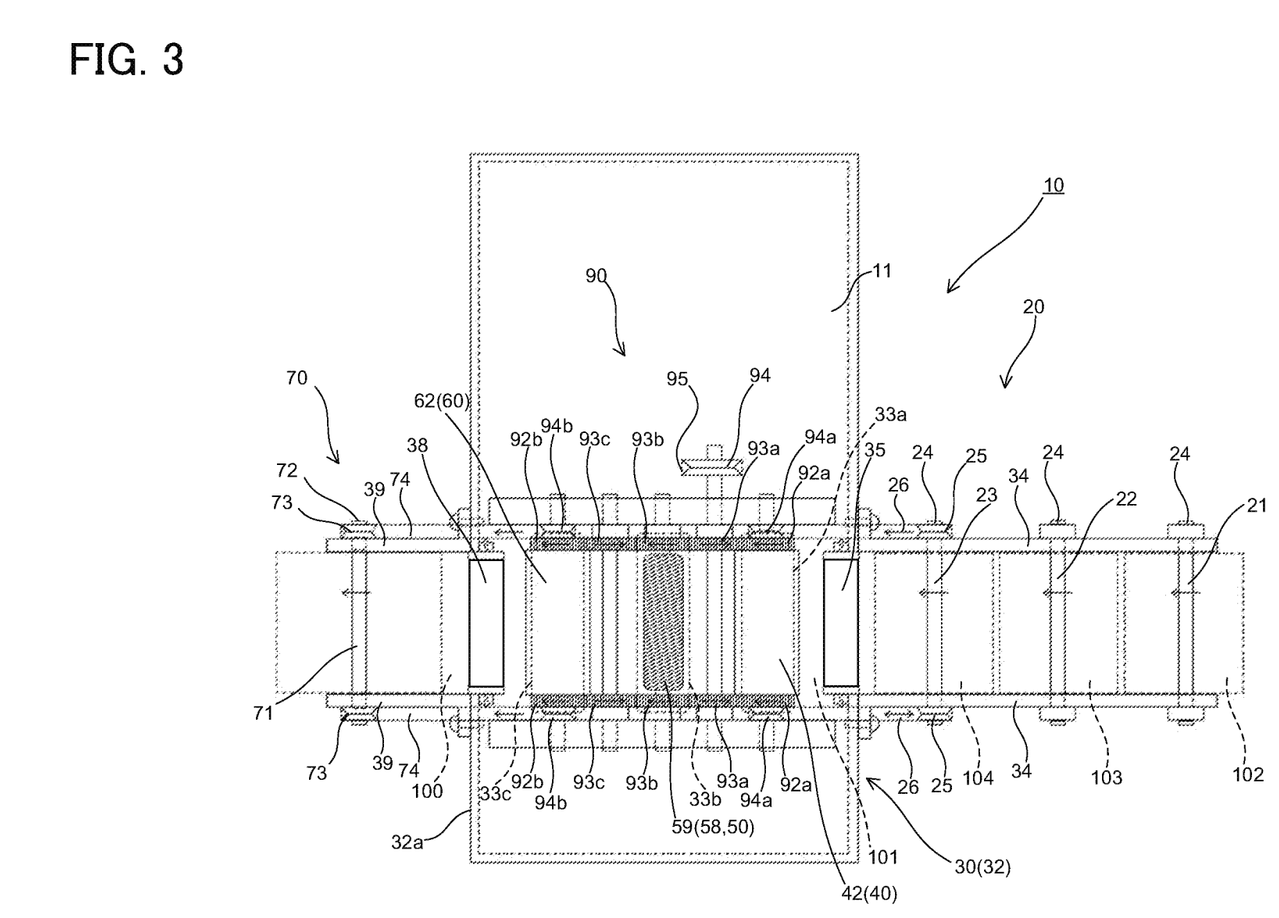
FIG. 3 is a plan view of a lower mechanism viewed from a direction indicated by arrows of line III-III in FIG. 1.

As shown in FIGS. 1 and 3, the feeding mechanism 20 comprises a plurality of feeding rolls 21, 22, and 23. In the embodiment shown in FIGS. 1 and 3, three feeding rolls, specifically, a first roll 21, a second roll 22, and a third roll 23, are provided, and their respective roll shafts 24 are rotatably mounted on an arm 34 attached to a lower frame 32a. In FIG. 3, the lower frame 32a is partially shown in dotted lines. The decorative strip material 101 is wound around the feeding rolls 21, 22, and 23, which will be described later. The decorative strip material 101 includes a protective retention layer 102, an upper layer 103, and a lower layer 104, and is wound around the first to third feeding rolls 21, 22, and 23, for example. If the number of layers of decorative strip materials 101 is increased, the number of feeding rolls may be correspondingly increased.

As shown in FIGS. 1 and 3, a roll shaft 24 is mounted on an end edge thereof with a pulley 25 (illustrated provided on the feeding roll 23. A V-belt 26 suspended on the pulley 25 is power-transmissibly connected to a lower drive mechanism 90, which will be described later. The feeding rolls 21, 22, and 23 are configured to rotate in the direction of feeding the decorative strip material 101 in response to the power received from the lower drive mechanism 90. The feeding rolls 21, 22, and 23 may be driven by other drive mechanisms.

The protective retention layer 102, the upper layer 103, and the lower layer 104 are fed out from the feeding rolls 21, 22, and 23 of the feeding mechanism 20, and then sent to the processing mechanism 30. The processing mechanism 30 is provided with a feeding roller 35 on an end edge of the lower frame 32a. The protective retention layer 102, the upper layer 103, and the lower layer 104 are stacked on each other at the feeding roller 35, with the protective retention layer 102 facing upward.

Figure 2:
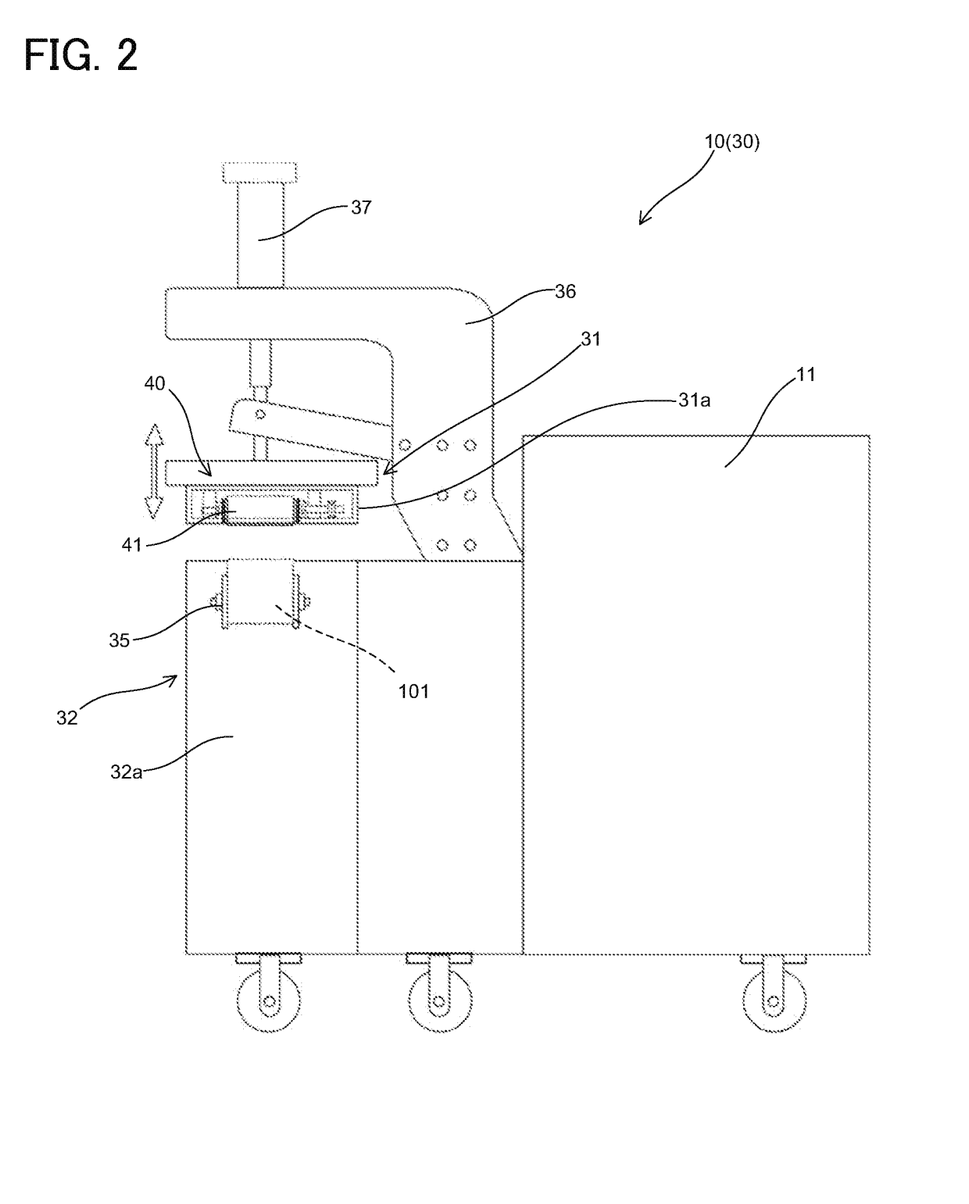
FIG. 2 is a side view of a processing mechanism of the production apparatus shown in FIG. 1.

The processing mechanism 30 includes the preheating mechanism 40, the shaping mechanism 50, and the cooling mechanism 60 from the upstream side. These mechanisms are provided in the upper mechanism 31 and the lower mechanism 32 that are arranged facing each other. The upper mechanism 31 is configured to be movable up and down relative to the lower mechanism 32. For example, as shown in FIG. 2, An elevating mechanism with a cylinder 37 is attached to an arm 36 protruding from the lower frame 32a. The upper mechanism 31 is provided at a lower end of the cylinder 37 and is moveable up and down by the extension and retraction of the cylinder 37. In FIGS. 1 and 2, the upper mechanism 31 is shown spaced apart from the lower mechanism 32 to facilitate understanding of the constitution of each portion. However, when a strip of three-dimensional decorative piece 100 is produced, the upper mechanism 31 comes close to the lower mechanism 32. The heating rolls 41 and 42, electrode dies 51 and 58, and cooling rolls 61 and 62 move to positions where they are adjacent to each other.

Figure 4:
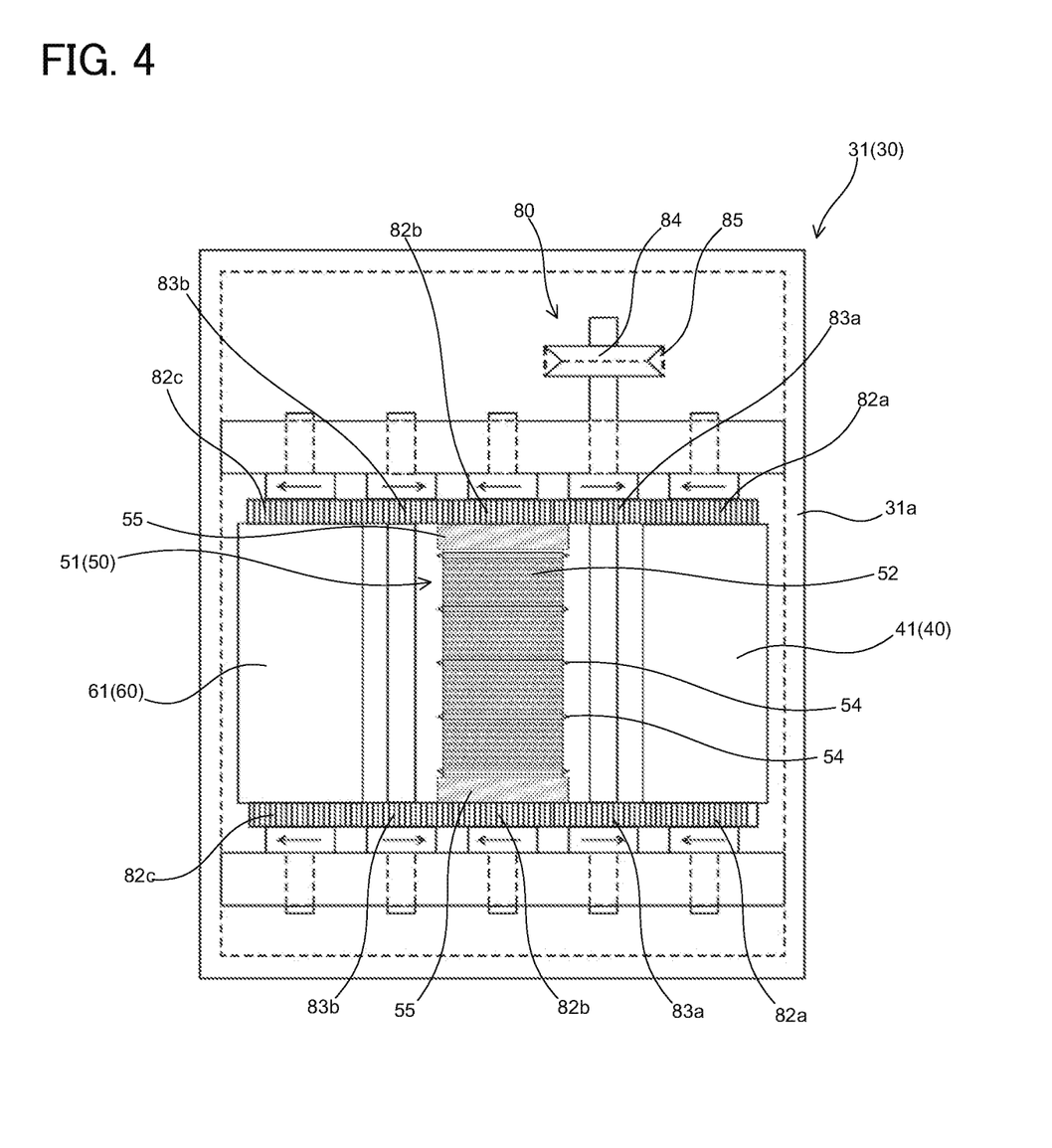
FIG. 4 is a plan view of an upper mechanism shown in FIG. 1.

The preheating mechanism 40 is a mechanism for preheating and softening the decorative strip material 101 and is located on the upstream side in the processing mechanism 30. The preheating mechanism 40 may be heating rolls 41 and 42 with built-in heaters, for example. The heating rolls 41 and 42 are arranged so as to face each other vertically, and can be rotated respectively by drive mechanisms 80 and 90 in synchronization with each other, which will be described later. The upper heating roll 41 is disposed in the upper mechanism 31, such that a portion of the circumferential surface thereof comes out of the bottom surface of the upper frame 31a, as shown in FIGS. 1 and 4. The lower heating roll 42 is disposed in the lower mechanism 32, such that a portion of the circumferential surface thereof comes out of a window 33a formed in the top surface of the lower frame 32a, as shown in FIGS. 1 and 3. The preheating mechanism 40 may be a block-type heater, instead of the rotatable heating rolls 41 and 42.

The decorative strip material 101 is fed to the preheating mechanism 40 and is softened with heat by the upper and lower heating rolls 41 and 42. Then, the heat-softened decorative strip material 101 is fed to the shaping mechanism 50 on the downstream side.

The shaping mechanism 50 is a mechanism for shaping the decorative strip material 101 softened by the preheating mechanism 40 and fusion-cutting the decorative strip material 101 as needed. The shaping mechanism 50 comprises a drum-type upper electrode roll die 51 on the upper side and a lower electrode die 58 on the lower side facing the upper electrode roll die 51, and performs high-frequency dielectric heating using these dies 51 and 58 as electrodes.

Figure 5:
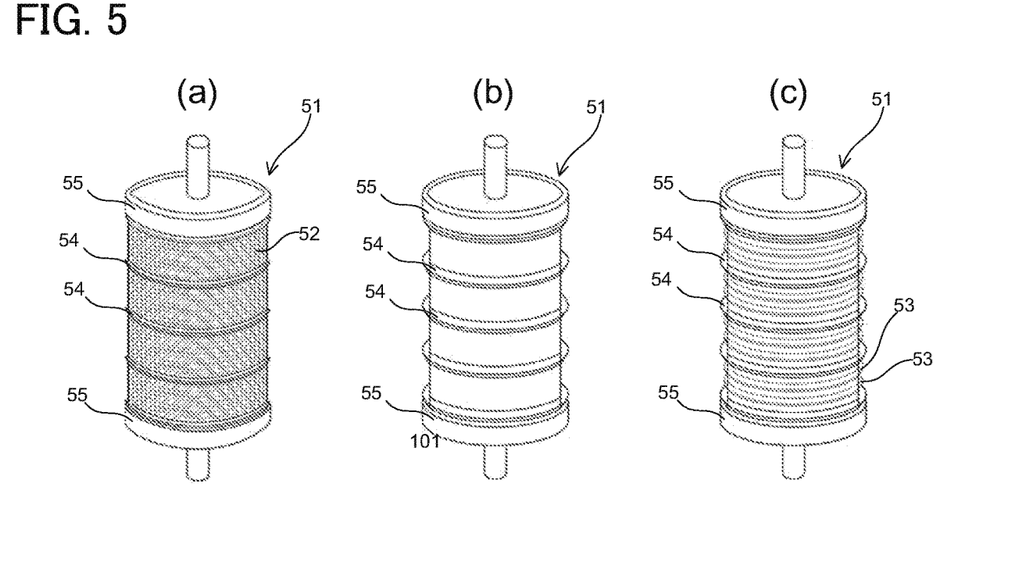
FIG. 5 is a perspective view showing embodiments (a) to (c) of an upper electrode roll die.

As shown in FIGS. 1 and 4, the upper electrode roll die 51 is disposed such that a portion of the circumferential surface thereof comes out of the bottom surface of the upper frame 31a, and can be rotated by the upper drive mechanism 80, which will be described later. The upper electrode roll die 51 may have a drum-type with a length of 6 cm to 12 cm, and a diameter of 3 cm to 10 cm, for example. As shown in FIGS. 5 (a) to 5 (c), the upper electrode roll die 51 is engraved on the body portion thereof with a pattern 52 and fusion-cutting blades 54 having sharp tips. The upper electrode roll die 51 is mounted on end edges thereof with cushion rubber rings 55 that mitigates interference and collision with the lower frame 32a or the lower electrode die 58, and performs insulation.

Figure 7:
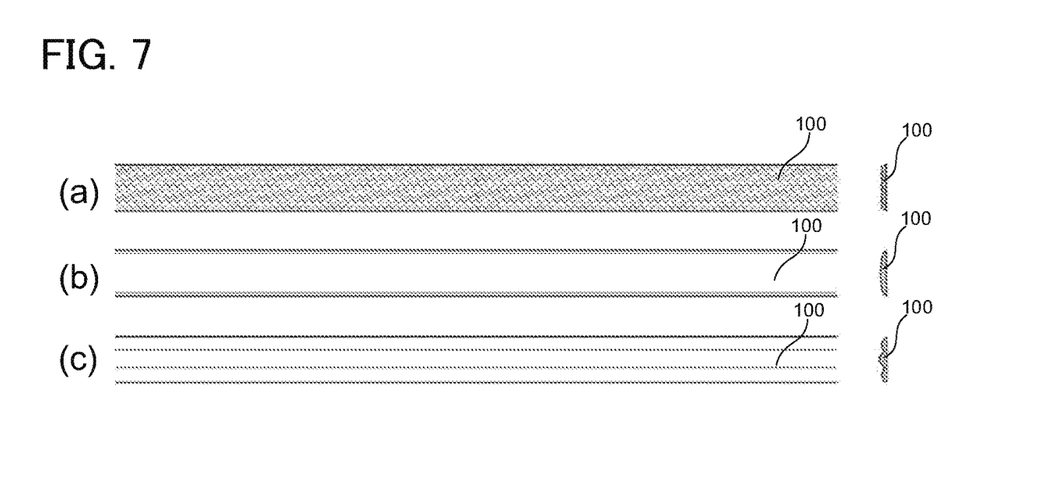
FIG. 7 is a plan view and a sectional view of the strip of three-dimensional decorative piece, wherein (a) to (c) shows the strip of three-dimensional decorative pieces produced using the upper electrode roll dies shown in FIGS. 5 (a) to 5 (c), respectively.

The upper electrode roll die 51 shown in FIG. 5 (a) has a fine zigzag pattern engraved as the pattern 52 on the body portion to form fusion-cutting blades 54 arranged in 5 rows at equal intervals, so that the zigzag pattern is applied to the strip of three-dimensional decorative piece 100 (FIG. 7 (a)), which will be described later. The upper electrode roll die 51 shown in FIG. 5 (b) is provided with fusion-cutting blades 54 that are slightly higher than the circumferential surface of its body portion, whereby a semi-cylindrical strip of three-dimensional decorative piece 100 having a slightly swelled center is formed, as shown in FIG. 7 (b). The upper electrode roll die 51 shown in FIG. 5 (c) has a plurality of line-pressing protrusions 53 lower than the fusion-cutting blades 54. As shown in FIG. 7 (c), the strip of three-dimensional decorative piece 100 is formed with a stripe-like line pattern. Of course, these patterns and the fusion-cutting blades 54 are only examples.

It is desired that the upper electrode roll die 51 has a built-in heater so as to easily perform shaping and fusion-cutting.

The lower electrode die 58 is arranged below the upper electrode roll die 51 and has a flat top surface that comes out of a window 33b formed on the top surface of the lower frame 32a. The lower electrode die 58 has a surface covered with an insulating cloth 59 to realize insulation between the lower electrode die 58 and the upper electrode roll die 51 and to prevent sparks.

The decorative strip material 101 is subject to high-frequency dielectric heating between the upper electrode roll die 51 and the lower electrode die 58. As shown in FIG. 2, a high-frequency oscillator is built in a control box 11 disposed on the back surface side of the production apparatus 10. The upper electrode roll die 51 and the lower electrode die 58 are connected to the high-frequency oscillator. The decorative strip material 101 softened by the preheating mechanism 40 is fed between the upper electrode roll die 51 and the lower electrode die 58, and is subject to high-frequency dielectric heating, whereby the decorative strip material 101 expands and is shaped, and is fusion-cut by the fusion-cutting blades 54.

Then, the decorative strip material 101 that has been shaped and fusion-cut by the shaping mechanism 50 is sent in a heated state to the cooling mechanism 60 on the downstream side, and is cooled so that its shape is stabilized. The cooling mechanism 60 may be the cooling rolls 61 and 62, for example. The cooling mechanism 60 is connected to a cold water circulating device (chiller) with a tube to circulate cold water and maintain a low temperature. The cooling rolls 61 and 62 are arranged facing each other vertically, and can be rotated in synchronization with each other by the drive mechanisms 80 and 90, which will be described later. The upper cooling roll 61 is placed in the upper mechanism 31, such that a portion of the circumferential surface thereof comes out of the bottom surface of the upper frame 31a, as shown in FIGS. 1 and 4. The lower cooling roll 62 is placed in the lower mechanism 32, such that a portion of the circumferential surface thereof comes out of the window 33c formed in the top surface of the lower frame 32a, as shown in FIGS. 1 and 3. The cooling mechanism 60 may be a block type, instead of the rotatable cooling rolls 61 and 62.

The decorative strip material 101 is cooled by the cooling mechanism 60 to complete the shape, and then becomes a strip of three-dimensional decorative piece 100. Then, the strip of three-dimensional decorative piece 100 is sent to the winding mechanism 70 through a feeding roller 38 provided at the end edge of the lower frame 32a. The winding mechanism 70 comprises a winding roll 71, as shown in FIGS. 1 and 3. A roll shaft 72 of the winding roll 71 is rotatably mounted on the arm 39 attached to the lower frame 32a. The roll shaft 72 is mounted on the end edge thereof with a pulley 73 and rotate via a V-belt 74 suspended on the roll shaft 72 by the motive force from the lower drive mechanism 90, thus winding up the strip of three-dimensional decorative piece 100.

In the above-described production apparatus 10, the upper heating roll 41, the upper electrode roll die 51, and the upper cooling roll 61 of the upper mechanism 31 can be rotated by the upper drive mechanism 80. The upper drive mechanism 80 may utilize one upper transmission motor 81 provided on the upper frame 31a as a driving source. Specifically, the upper heating roll 41, the upper electrode roll die 51, and the upper cooling roll 61 are provided on their rotation shafts with gears 82a, 82b, and 82c, respectively. The gears 82a, 82b and the gears 82b, 82c are associated rotatably in the same direction via feed gears 83a, 83b, respectively. The feed gear 83a comprises a pulley 84 coaxially therewith, which is associated with an upper transmission motor 81 via a V-belt 85 and is power-transmissible. The feed gear 83a rotates via V-belt 85 by driving the upper transmission motor 81. Then, the upper heating roll 41, the upper electrode roll die 51, and the upper cooling roll 61 of the upper mechanism 31 rotate by the engagement between the gears 82a, 83a, 82b, 83b, and 82c. When the upper heating roll 41, the upper electrode roll die 51, and the upper cooling roll 61 have the same outer diameter, they are desirable to rotate synchronously at the same rotational speed to prevent the decorative strip material 101 from being loosened.

Thus, the upper heating roll 41, the upper electrode roll die 51, and the upper cooling roll 61 are rotated synchronously in the same direction by driving the upper transmission motor 81.

Also, the lower heating roll 42, the lower cooling roll 62, the feeding rolls 21, 22, and 23, and the winding roll 71 of the lower mechanism 32 can be rotated by the lower drive mechanism 90. The lower drive mechanism 90 may utilize a single lower transmission motor 91 provided on the lower frame 32a as a driving source. Specifically, the lower heating roll 42 and the lower cooling roll 62 are provided on their rotation shafts with gears 92a and 92b, which are associated rotatably in the same direction via feed gears 93a, 93b, and 93c. The feed gears 93a comprises a pulley 94 coaxially therewith, which is associated with an lower transmission motor 91 via a V-belt 95 and is power-transmissible. The lower heating roll 42 is provided with a pulley 94a coaxially with the gear 92a. The roll shafts 24 of the feeding rolls 21, 22, and 23 comprise pulleys 25, and the pulleys 94a and 25 are associated with each other by V-belts 26 (only the third feeding roll 23 is illustrated). Similarly, the lower cooling roll 62 is provided on the rotation shaft with a pulley 94b, and the winding roll 71 is also provided on the roll shaft 72 with a pulley 73. The pulleys 94b and 73 are associated with each other by V-belts 74.

Thus, the lower heating roll 42 and the lower cooling roll 62 are rotated in the same direction by driving the lower transmission motor 91. The feed rolls 21, 22, and 23 are rotated in the feeding direction of the decorative strip material 101, and the winding roll 71 is rotated in the winding direction of the strip of three-dimensional decorative piece 100.

Figure 10:
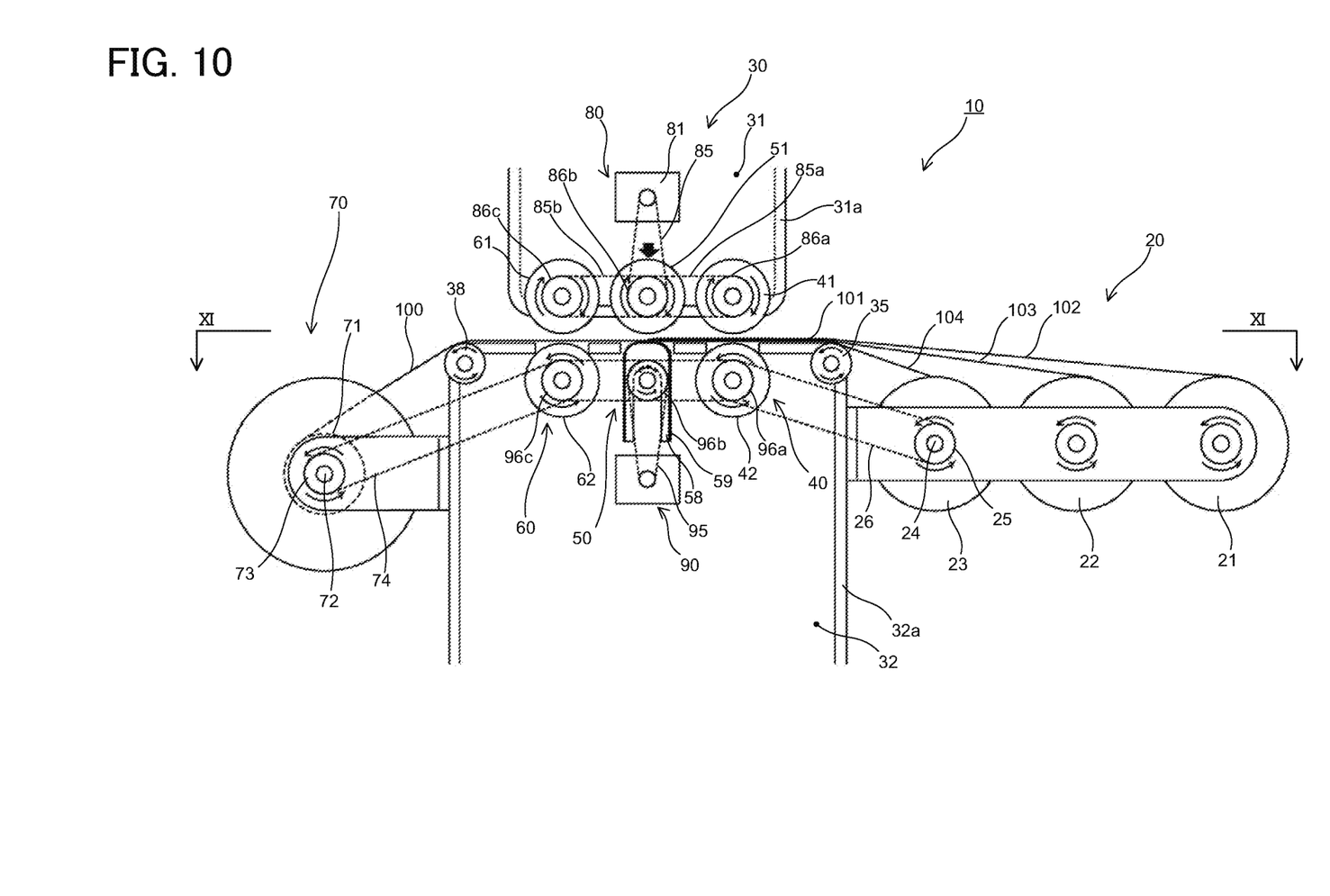
FIG. 10 is a side view showing a structure of an apparatus for producing a strip of three-dimensional decorative piece according to another embodiment of the present invention.
Figure 11:
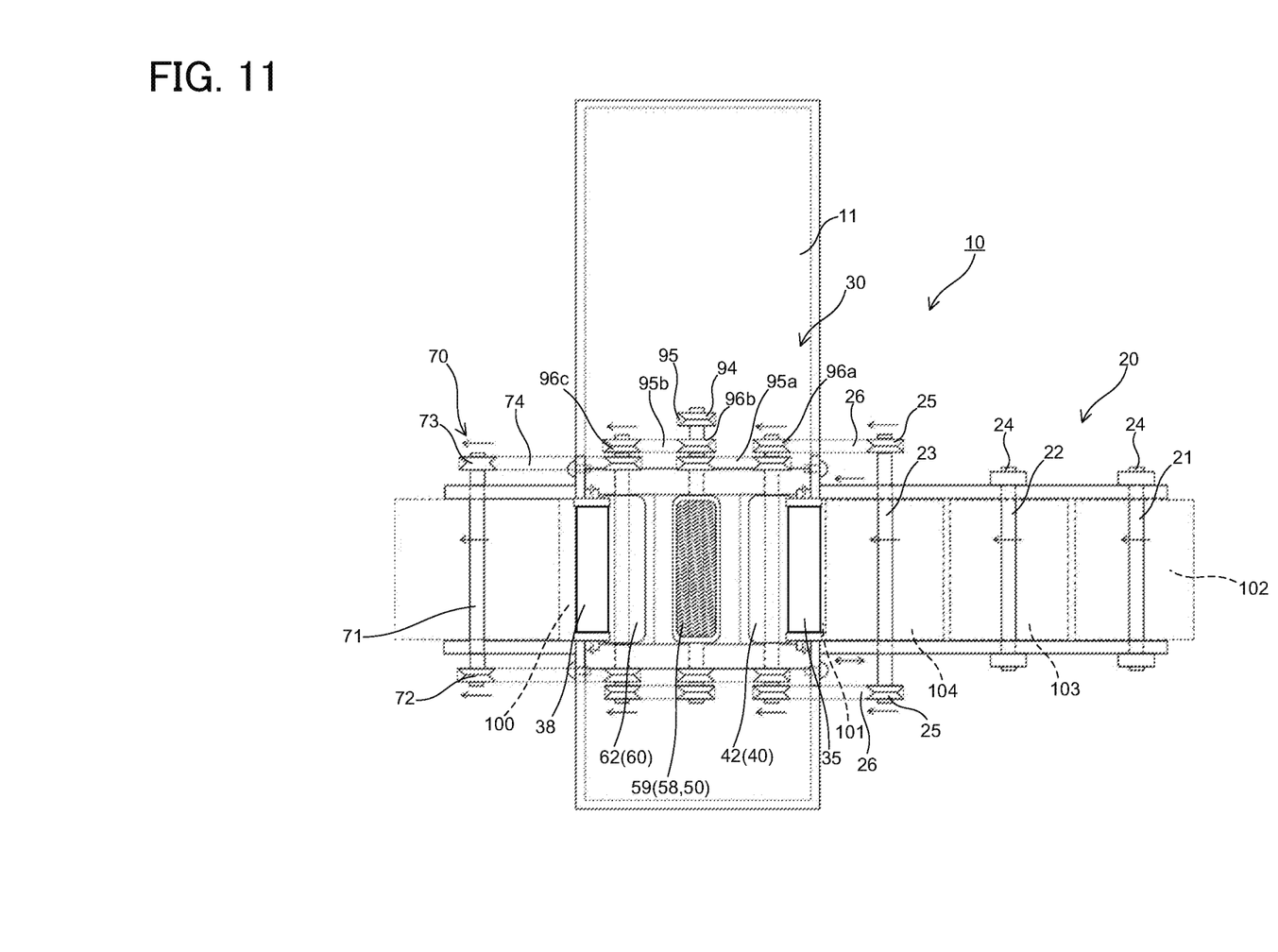
FIG. 11 is a plan view of the lower mechanism viewed from a direction indicated by arrows of line XI-XI in FIG. 10.
Figure 12:
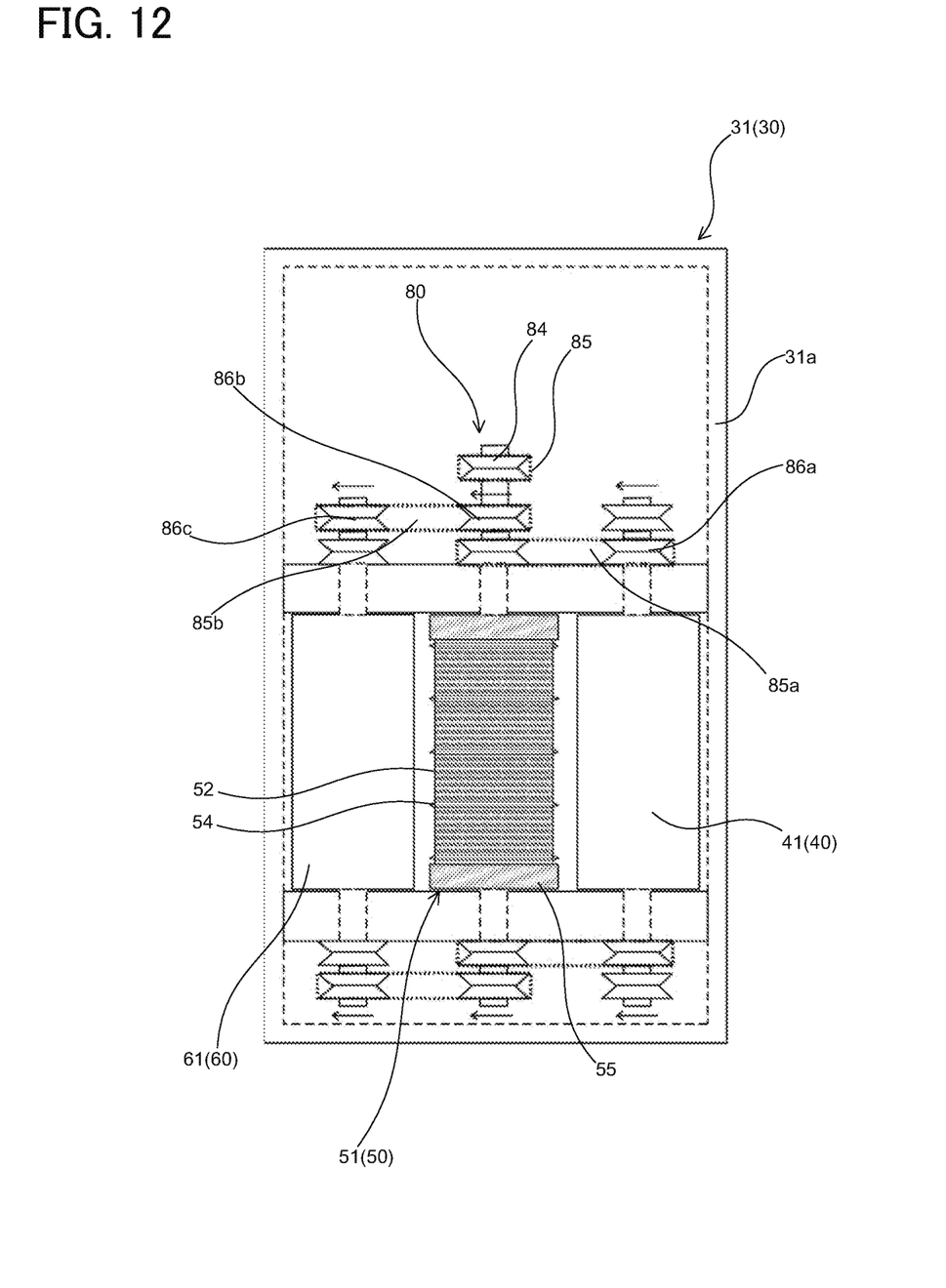
FIG. 12 is a plan view of the upper mechanism shown in FIG. 10.

The drive mechanisms 80 and 90 are not limited to this embodiment. As shown in FIGS. 10 to 12, which will be described later, the drive mechanisms may be power-transmissible by the V-belt and the pulley without using gears, or can be driven by an independent drive motor or multiple common motors.

<Decorative Strip Material 101>

Figure 6:
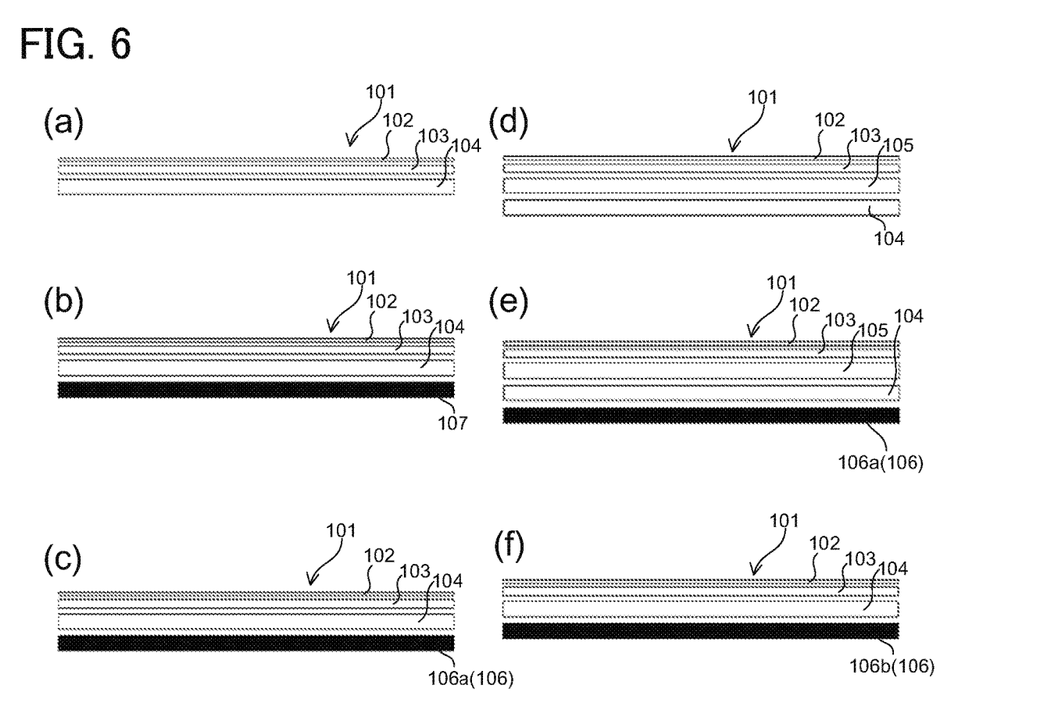
FIG. 6 is a sectional view of a decorative strip material.

As in examples shown in FIGS. 6 (a) to 6 (f), the decorative strip material 101, which is to be a material of the strip of three-dimensional decorative piece 100, may be composed of a lengthy material that comprises at least the protective retention layer 102, the upper layer 103, and the lower layer 104, which are respectively wound around the feeding rolls 21, 22, and 23. The layer structure, material, thickness, and the like of the strip of three-dimensional decorative piece 100 are described below but are not limited to them.

The protective retention layer 102 is a film having a thickness of 30 μm to 100 μm, such as a polypropylene film or a polyethylene film, which is not fusion-cut by high frequencies. The protective retention layer 102 serves to assist in forming and fusion-cutting thermoplastic synthetic resin of other layers, and to hold the formed strip of three-dimensional decorative piece 100.

The upper layer 103 is a soft film of thermoplastic synthetic resin such as polyvinyl chloride or polyurethane, or a metal-deposited laminated film obtained through metal vapor deposition. The upper layer 103 can be colored or printed with patterns. Examples of printing include roll screen printing, offset printing, gravure printing, and ink-jet printing. The upper layer 103 may be a film obtained by laminating a migration prevention film and thermoplastic synthetic resin film on the bottom surface of the metal-deposited layer with an adhesive layer interposed therebetween. An example of the migration prevention film is an ethylene-vinyl alcohol copolymer (EVOH) film. The migration prevention film prevents a dye of a garment or the like from migrating to the surface of the strip of three-dimensional decorative piece 100.

The lower layer 104 is a soft sheet made of thermoplastic synthetic resin. Examples this resin include soft polyvinyl chloride (PVC) and polyurethane (PU).

FIG. 6 (a) shows an example of the decorative strip material 101 with a three-layer structure wherein the protective retention layer 102, the upper layer 103, and the lower layer 104 are stacked on each other. The decorative strip materials 101 with layer structures shown in FIGS. 6 (b) to 6 (f) includes a intermediate layer 105 described below, an adhesive layer 106, substrate 107, and the like.

The intermediate layer 105 is a thermoplastic synthetic resin foam sheet (foam sheet). The adhesive layer 106 is a piece of double-sided tape 106a or a hot-melt film 106b. The substrate 107 is a cloth, synthetic leather, or a synthetic resin sheet.

The width of the decorative strip material 101 may be set depending on the required width of the strip of three-dimensional decorative piece 100 (the total width if multiple rows are used) or the width of the upper electrode roll die 51 as appropriate.

<Method for Producing Strip of Three-Dimensional Decorative Piece 100 of Thermoplastic Resin>

The above-described production apparatus 10 and a method for producing the strip of three-dimensional decorative piece 100 using the decorative strip material 101 shown in FIG. 6 (a) will be described.

With regard to the production apparatus 10, the protective retention layer 102, the upper layer 103, and the lower layer 104 are wound around the feeding rolls 21, 22, and 23, respectively. In the initial state, the cylinder 37 is retracted, and the upper mechanism 31 is positioned away from the lower mechanism 32.

From this state, a predetermined length of the protective retention layer 102, the upper layer 103, and the lower layer 104 are pulled out. Then, these layers are stacked in three layers at the feeding roller 35, fed as a decorative strip material 101 to between the upper mechanism 31 and the lower mechanism 32, and sent to the winding roll 71 via the feeding roller 38. A leading end of the decorative strip material 101 is adhered to the winding roll 71 with tape or the like.

Then, the heaters of the preheating mechanism 40 and the shaping mechanism 50 are activated to heat the heating rolls 41 and 42, the upper electrode roll die 51, and the lower electrode die 58. The cooling mechanism 60 is activated to cool the cooling rolls 61 and 62.

Then, the upper transmission motor 81 and the lower transmission motor 91 are activated, and the cylinder 37 is extended to bring the upper mechanism 31 closer to the lower mechanism 32. Also, the shaping mechanism 50 continuously oscillates a high frequency between the upper electrode roll die 51 and the lower electrode die 58 to perform high-frequency dielectric.

The upper transmission motor 81 and the lower transmission motor 91 are activated to have the drive mechanisms 80 and 90 rotate the feeding rolls 21, 22, and 23, the heating rolls 41 and 42, the upper electrode roll die 51, the cooling rolls 61 and 62, and the winding roll 71.

The feeding rolls 21, 22, and 23 and the winding roll 71 are rotated, whereby the protective retention layer 102, the upper layer 103, and the lower layer 104 wound around the feeding rolls 21, 22, and 23 are drawn out from these rolls, while being stacked in three layers, and supplied as the decorative strip material 101 to the processing mechanism 30 that comprises, from the upstream side, a preheating mechanism 40, a shaping mechanism 50, and a cooling mechanism 60.

In the preheating mechanism 40, the decorative strip material 101 is preheated and softened between the heating rolls 41 and 42. The heating rolls 41 and 42 are rotated in the direction of moving the decorative strip material 101, whereby the decorative strip material 101 smoothly passes through the preheating mechanism 40 while the decorative strip material 101 is being preheated and softened.

In the subsequent shaping mechanism 50, the heat-softened decorative strip material 101 is subjected to high-frequency dielectric heating between the upper electrode roll die 51 and the lower electrode die 58, and is shaped into the pattern 52 of the upper electrode roll die 51, and is cut to a predetermined width by the fusion-cutting blades 54. The protective retention layer 102 is not fusion-cut.

In the shaping mechanism 50, the upper electrode roll die 51 is rotated in the direction of moving the decorative strip material 101, with the result that the decorative strip material 101 is smoothly moved to perform shaping and fusion-cutting efficiently.

FIG. 7 (a) shows the strip of three-dimensional decorative piece 100 on which a zigzag pattern of the upper electrode roll die 51 shown in FIG. 5 (a) was transferred. FIG. 7 (b) shows the strip of three-dimensional decorative piece 100 formed into a semi-cylindrical shaped section by the upper electrode roll die 51 shown in FIG. 5 (b). FIG. 7 (c) shows the strip of three-dimensional decorative piece 100 having a section of stripe-like recesses formed as line patterns by the upper electrode roll die 51 shown in FIG. 5 (c). Each of the upper electrode roll dies 51 shown in FIGS. 5 (a) to 5 (c) is provided with five rows of fusion-cutting blades 54. Therefore, four rows of the strip of three-dimensional decorative pieces 100 shown in FIGS. 7 (a) to 7 (c) can be formed simultaneously, and these pieces are obtained in a state held by one protective retention layer 102.

After that, the strip of three-dimensional decorative piece 100 enter into between the cooling rolls 61 and 62 of the cooling mechanism 60 on the downstream side, and are cooled so that the shape of the strip of three-dimensional decorative piece 100 is stabilized. Then, the strip of three-dimensional decorative piece 100 is wound around the winding roll 71 in the winding mechanism 70 on the downstream side, thus a long strip of three-dimensional decorative piece 100 wound around the winding roll 71 is obtained.

The user can remove the unneeded portions from the protective retention layer 102 of the long strip of three-dimensional decorative piece 100 at the time of use and then cut the strip to an appropriate length for attaching to an object such as a car, a motorbike, a boat, a piece of furniture, a game console, clothes, a bag, or a cap.

According to the present invention, the decorative strip material 101 is successively fed to between the rotating heating rolls 41 and 42, between the rotating upper and electrode roll dies 51 and 58, and between the rotating cooling rolls 61 and 62. The decorative strip material 101 is softened with heat by the heating rolls 41 and 42, continuously shaped by the upper electrode roll die 51 and the lower electrode die 58 through high-frequency dielectric heating, and then is fixed in shape by the cooling rolls 61 and 62. Thus, a long strip of three-dimensional decorative piece 100 can be produced easily.

Figure 8:
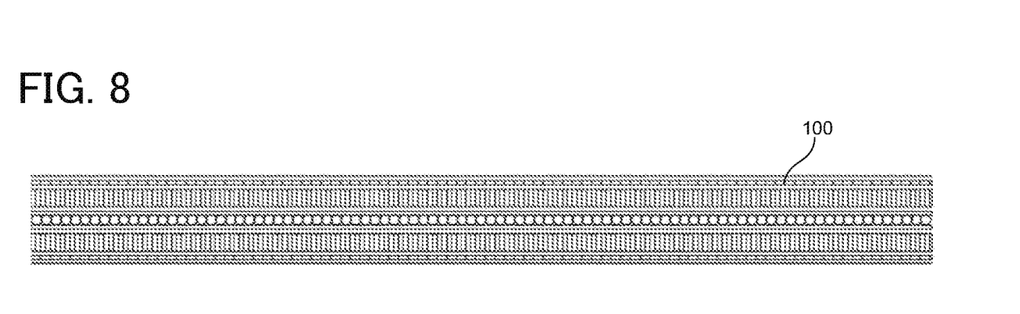
FIG. 8 is a plan view of a strip of three-dimensional decorative piece with a striped woven gold wire pattern.
Figure 9:
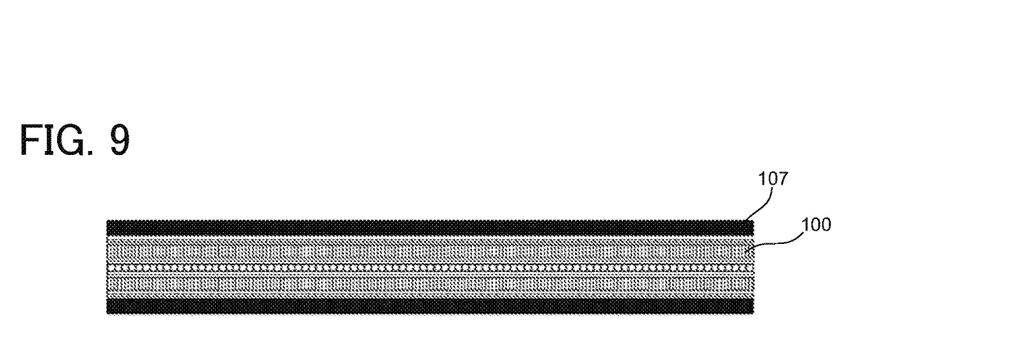
FIG. 9 is a plan view of a strip of the three-dimensional decorative piece shown in FIG. 8 having fused to a substrate of cloth wherein a portion for seam is left.

FIG. 8 shows one example of the strip of three-dimensional decorative piece 100 having a more complicated striped woven gold wire pattern. The strip of three-dimensional decorative piece 100 may be welded leaving a seam allowance on the substrate 107 of a cloth, as shown in FIG. 9.

The foregoing description is given merely to describe the present invention, and therefore should not be construed as limiting the invention recited in the appended claims or narrowing the scope of the present invention. Also, the constituent elements of the present invention are not limited to those described in the embodiments above, and it is of course possible to make various modifications within the technical scope defined in the appended claims.

FIGS. 10 to 12 show other embodiments with a different drive mechanism. As shown in FIGS. 10 to 12, the upper drive mechanism 80 is provided with pulleys 86a, 86b, and 86c, at the end edges of the upper heating roll 41, the upper electrode roll die 51 and the upper cooling roll 61. The pulley 86b is two groove pulleys. An upper transmission motor 81 and a pulley 86b are connected to each other by a V-belt 85. The pulleys 86a and 86b are connected to each other by a V-belt 85a. The pulleys 86b and 86c are connected to each other by a V-belt 85b in the same manner. The upper heating roll 41, the upper electrode roll die 51, and the upper cooling roll 61 are rotated synchronously in the same direction by driving the upper transmission motor 81.

The lower drive mechanism 90 comprises pulleys 96a, 96b, and 96c at end edges of and between the lower heating roll 42 and the lower cooling roll 62. Each of the pulleys 96a, 96b, and 96c are two groove pulleys. A lower transmission motor 91 and a pulley 96b are connected to each other by a V-belt 95. The pulleys 96a and 96b are connected to each other by a V-belt 95a. The pulleys 96b and 96c are connected to each other by a V-belt 95b. The feed roll 23 and the winding roll 71, etc. are connected to each other by the V-belts 26 and 74 in the same manner as in FIG. 1 and the like. Accordingly, the lower heating roll 42, the lower cooling roll 62, the feed rolls 21 to 23, and the winding roll 71 are rotated synchronously in the same direction by driving the lower transmission motor 91.

LIST OF REFERENCE NUMERALS

- 10 Production apparatus
- 20 Feeding mechanism
- 21 to 23 Feeding roll
- 30 Processing mechanism
- 40 Preheating mechanism
- 41, 42 Heating roll
- 50 Shaping mechanism
- 51 Upper electrode roll die
- 58 Lower electrode roll die
- 60 Cooling mechanism
- 61, 62 Cooling roll
- 70 Winding mechanism
- 71 Winding roll
- 100 Strip of three-dimensional decorative piece
- 101 Decorative strip material

The invention claimed is:

1. A method for producing a strip of three-dimensional decorative piece of thermoplastic synthetic resin, the method comprising:
    a step of feeding a decorative strip material having three layers of a lower layer, an upper layer on the lower layer, and a protective retention layer on the upper layer, wherein the lower layer is a sheet of thermoplastic synthetic resin, the upper layer is a film of thermoplastic synthetic resin, and the protective retention layer is not fusion-cut by the heat of a high frequency;
    a step of preheating the decorative strip material to soften the strip material with heat, wherein the preheating step comprises softening the decorative strip material between an upper heating roll and a lower heating roll that are arranged facing each other vertically and are configured to rotate synchronously with each other;
    a step of shaping the decorative strip material into a strip of three-dimensional decorative piece by continuously oscillating a high-frequency in between a rotatable upper electrode roll die and a rotatable lower electrode roll die and applying high-frequency dielectric heat to the decorative strip material between the upper and lower electrode roll dies;
    a step of cooling the shaped strip of three-dimensional decorative piece; and
    a step of winding up the cooled strip of three-dimensional decorative piece.

2. The method for producing a strip of three-dimensional decorative piece of thermoplastic synthetic resin according to claim 1, wherein
    the lower layer, the upper layer, and the protective retention layer are wound around their respective feeding rolls, and
    the feeding step comprises drawing out the lower layer, the upper layer, and the protective retention layer from their respective feeding rolls while being stacked in three layers, and supplying as the decorative strip material to the preheating step.

3. The method for producing a strip of three-dimensional decorative piece of thermoplastic synthetic resin according to claim 1, wherein
    the cooling step comprises cooling the strip of three-dimensional decorative piece between an upper cooling roll and a lower cooling roll that are arranged facing each other vertically and are configured to rotate synchronously with each other.

4. The method for producing a strip of three-dimensional decorative piece of thermoplastic synthetic resin according to claim 1, wherein
    the upper electrode roll die has a circumferential surface with one or more fusion-cutting blades projecting therefrom.

5. The method for producing a strip of three-dimensional decorative piece of thermoplastic synthetic resin according to claim 1,
    wherein the upper electrode roll die has a body portion engraved with a pattern.

6. An apparatus for producing a strip of three-dimensional decorative piece of thermoplastic synthetic resin, the apparatus comprising:
    a feeding mechanism configured to feed a decorative strip material having three layers of a lower layer, an upper layer on the lower layer, and a protective retention layer on the upper layer, wherein the lower layer is a sheet of thermoplastic synthetic resin, the upper layer is a film of thermoplastic synthetic resin, and the protective retention layer is not to be fusion-cut by the heat of a high frequency;
    a preheating mechanism provided on a downstream side of the feeding mechanism and configured to soften the decorative strip material with heat, wherein the preheating mechanism comprises an upper heating roll and a lower heating roll that are arranged facing each other vertically and configured to rotate synchronously with each other;
    a shaping mechanism provided on a downstream side of the preheating mechanism,
    wherein the shaping mechanism comprises a rotatable upper electrode roll die and a rotatable lower electrode roll die capable of contact with the upper electrode roll die,
    the shaping mechanism being configured to shape the decorative strip material into a strip of three-dimensional decorative piece by continuously oscillating a high-frequency in between the rotatable upper electrode roll die and the rotatable lower electrode roll die and applying high-frequency dielectric heat to the heat-softened decorative strip material between the upper and lower electrode roll dies;
    a cooling mechanism provided on a downstream side of the shaping mechanism and configured to cool the shaped strip of three-dimensional decorative piece; and
    a winding mechanism provided on a downstream side of the cooling mechanism and configured to wind up the cooled strip of three-dimensional decorative piece.

7. The apparatus for producing a strip of three-dimensional decorative piece of thermoplastic synthetic resin according to claim 6, wherein
the upper electrode roll die has a circumferential surface with one or more fusion-cutting blades projecting therefrom.

8. The apparatus for producing a strip of three-dimensional decorative piece of thermoplastic synthetic resin according to claim 6, wherein
the upper electrode roll die has a body portion engraved with a pattern.

9. The apparatus for producing a strip of three-dimensional decorative piece of thermoplastic synthetic resin according to claim 6, wherein
the cooling mechanism comprises an upper cooling roll and a lower cooling roll that are arranged facing each other vertically and configured to rotate synchronously with each other.

10. The apparatus for producing a strip of three-dimensional decorative piece of thermoplastic synthetic resin according to claim 6, wherein
the cooling mechanism comprises an upper cooling roll and a lower cooling roll that are arranged facing each other vertically and configured to rotate synchronously with each other, and
the upper electrode roll die, the upper heating roll, and the upper cooling roll are placed on an upper mechanism that is movable up and down.

11. The apparatus for producing a strip of three-dimensional decorative piece of thermoplastic synthetic resin according to claim 6, wherein
the cooling mechanism comprises an upper cooling roll and a lower cooling roll that are arranged facing each other vertically and configured to rotate synchronously with each other,
the upper electrode roll die, the upper heating roll, and the upper cooling roll are power-transmissibly connected to each other and rotatable with an upper motor, and
the lower electrode roll die, the lower heating roll and the lower cooling roll are power-transmissibly connected to each other and rotatable with an lower motor.

* * * * *